(12) United States Patent
Kume et al.

(10) Patent No.: US 11,941,983 B2
(45) Date of Patent: Mar. 26, 2024

(54) DRIVING ASSISTANCE DEVICE AND DRIVING ASSISTANCE SYSTEM

(71) Applicant: Hitachi Astemo, Ltd., Hitachinaka (JP)

(72) Inventors: Hideyuki Kume, Tokyo (JP); Hidehiro Toyoda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 2 days.

(21) Appl. No.: 17/784,485

(22) PCT Filed: Nov. 20, 2020

(86) PCT No.: PCT/JP2020/043337
§ 371 (c)(1),
(2) Date: Jun. 10, 2022

(87) PCT Pub. No.: WO2021/117464
PCT Pub. Date: Jun. 17, 2021

(65) Prior Publication Data
US 2023/0035819 A1    Feb. 2, 2023

(30) Foreign Application Priority Data

Dec. 12, 2019  (JP) .................... 2019-224342

(51) Int. Cl.
*G08G 1/16* (2006.01)
*B60W 40/105* (2012.01)
*B60W 50/16* (2020.01)
*B60W 30/12* (2020.01)
(Continued)

(52) U.S. Cl.
CPC .............. *G08G 1/16* (2013.01); *B60W 40/105* (2013.01); *B60W 50/16* (2013.01); *G08G 1/166* (2013.01);
(Continued)

(58) Field of Classification Search
CPC .......... G08G 1/16; G08G 1/166; G08G 1/167; G05D 1/00; G05D 1/02; B60W 50/00;
(Continued)

(56) References Cited

U.S. PATENT DOCUMENTS

2007/0150192 A1\* 6/2007 Wakamatsu ............ G01S 19/49
701/469
2016/0305794 A1\* 10/2016 Horita .................. G06V 20/584
(Continued)

FOREIGN PATENT DOCUMENTS

CN        105922991 A     9/2016
CN        109785667 A     5/2019
(Continued)

OTHER PUBLICATIONS

NPL Search (Nov. 8, 2023).\*
(Continued)

*Primary Examiner* — Van T Trieu
(74) *Attorney, Agent, or Firm* — Foley & Lardner LLP

(57) ABSTRACT

A driving assistance device includes a recording unit that records vehicle past traveling positions and related position estimation information, and a relative position estimation unit that estimates a vehicle relative position based on a sensor, adds a history of the relative position to the past traveling position, and uses the output of the sensor. The driving assistance device further includes a position estimation unit that estimates a vehicle position with respect to the past traveling positions and adds a history of the estimated position to the past traveling position, in addition to a deviation determination unit that determines deviation from the past traveling positions using a distribution of the past traveling positions, the vehicle position relative to the past traveling positions, and a reference value. The driving assistance device includes a control unit that controls the
(Continued)

vehicle to cancel a warning or deviation when the deviation is determined.

16 Claims, 14 Drawing Sheets

(51) Int. Cl.
B60W 50/14 (2020.01)
G06V 20/56 (2022.01)

(52) U.S. Cl.
CPC ............ *G08G 1/167* (2013.01); *B60W 30/12* (2013.01); *B60W 2050/143* (2013.01); *B60W 2050/146* (2013.01); *B60W 2420/42* (2013.01); *B60W 2540/215* (2020.02); *B60W 2552/53* (2020.02); *B60W 2556/10* (2020.02); *B60W 2556/40* (2020.02); *G06V 20/588* (2022.01)

(58) Field of Classification Search
CPC ...... B60W 50/14; B60W 50/16; B60W 40/10; B60W 40/105; B60W 30/095; B60W 30/12; B60W 20/56
See application file for complete search history.

(56) References Cited

U.S. PATENT DOCUMENTS

| | | | |
|---|---|---|---|
| 2017/0053533 A1* | 2/2017 | Kuroda | .................. G08G 1/167 |
| 2017/0345312 A1 | 11/2017 | Shimizu et al. | |
| 2018/0158338 A1 | 6/2018 | Kawaguchi et al. | |
| 2019/0302795 A1* | 10/2019 | Kobayashi | ........ B60W 60/0018 |
| 2019/0391594 A1* | 12/2019 | Takano | ................ G07C 5/0841 |

FOREIGN PATENT DOCUMENTS

| | | |
|---|---|---|
| JP | 2008-014870 A1 | 1/2008 |
| JP | 2011-164849 A | 8/2011 |
| JP | 2013-168016 A1 | 8/2013 |
| JP | 2015-162228 A1 | 9/2015 |
| JP | 2016-057750 A1 | 4/2016 |
| JP | 2016-085567 A | 5/2016 |

OTHER PUBLICATIONS

International Search Report with English Translations and Written Opinion for PCT/JP2020/043337 dated Feb. 16, 2021.

Office Action issued in corresponding Indian Application No. 202217032579 with Machine Translation, dated Oct. 18, 2022 (6 pages).

Office Action issued in corresponding Japanese Patent Application No. 2019-224342 with English Machine Translation dated Feb. 7, 2023 (6 pages).

Office Action issued in corresponding Chinese Application No. 202080084783.X, dated Jan. 11, 2024, with Machine translation (22 pages).

* cited by examiner

| THREE-DIMENSIONAL POSITION | IMAGE FEATURE AMOUNT |
|---|---|
| 10, 15, 1.5 | 3, 128, 50, ⋯ |
| −3.5, 2, −1 | 100, 29, 224, ⋯ |
| ⋮ | ⋮ |

| DRIVER | TIRE | NUMBER OF PASSENGERS | PRECEDING VEHICLE | SIGNAL | WEATHER | TRAVELING POSITION ID |
|---|---|---|---|---|---|---|
| A | NORMAL | ONE | PRESENCE | RED | FINE | 1, 5, ··· |
| A | NORMAL | THREE | ABSENCE | RED | FINE | 2, 3, ··· |
| B | NORMAL | ONE | ABSENCE | BLUE | FINE | 4, 9, ··· |
| A | NORMAL | TWO | ABSENCE | RED | RAINY | 6, 11, ··· |
| C | STUDLESS | FOUR | PRESENCE | RED | SNOWY | 13, 15, ··· |
| ⋮ | ⋮ | ⋮ | ⋮ | ⋮ | ⋮ | ⋮ |

VEHICLE SITUATION — SURROUNDING SITUATION

| 12e | | | | | | |
|---|---|---|---|---|---|---|
| 40 | 50 | 60 | 70 | 70 | 70 | 70 |
| 50 | 60 | 70 | 80 | 80 | 80 | 80 |
| 60 | 70 | 80 | 90 | 90 | 90 | 90 |
| 70 | 80 | 90 | 100 | 100 | 100 | 100 |
| 70 | 80 | 90 | 100 | 90 | 90 | 90 |
| 70 | 80 | 90 | 100 | 90 | 80 | 80 |
| 70 | 80 | 90 | 100 | 90 | 80 | 70 |
| 70 | 80 | 90 | 100 | 90 | 80 | 70 |

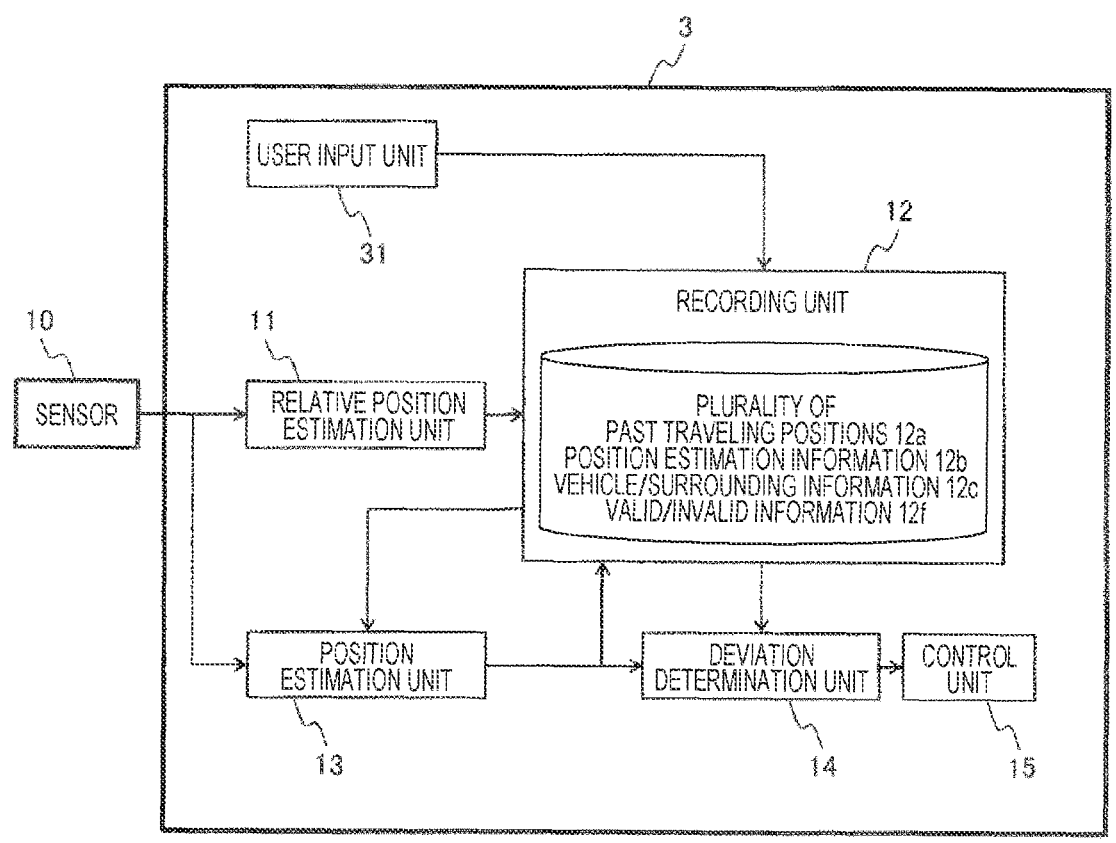

DRIVING ASSISTANCE DEVICE AND DRIVING ASSISTANCE SYSTEM

TECHNICAL FIELD

The present invention relates to a driving assistance device and a driving assistance system.

BACKGROUND ART

As one of driving support functions of an automobile, there is a lane deviation warning/control for issuing a warning to a driver or performing a control for canceling deviation, when the deviation from a lane is detected. In this type of lane deviation warning/control, a method of performing warning/control based on a lane dividing line detected by an in-vehicle sensor is widely used, but there is a problem that it is difficult to perform warning or return control in an environment in which a lane dividing line is not present in an intersection or the like, or in an environment in which it is difficult for the in-vehicle sensor to detect a lane dividing line due to an influence of blur or the like although there is a lane dividing line.

As an example of a technique for solving this problem, descriptions as follows are disclosed in the paragraphs 0007 and 0008 of PTL 1. "An object of the present invention is to realize a vehicle control device capable of performing LKA/LDW control from information of past traveling trajectories with reference to data of the past traveling trajectories of a car navigation, and performing lane keeping assistance or lane deviation prevention even when it is not possible to detect lane information from an image captured by a camera, or even when a vehicle is traveling on a road on which there is no map information without updating the map information". "Therefore, according to the present invention, in order to remove the above-described inconvenience, a vehicle control device that performs lane keeping assistance or lane deviation prevention includes: traveling trajectory storage means for storing a traveling trajectory of a vehicle; position detection means for detecting a current position of the vehicle; and lane deviation determination means for determining a degree of deviation of the vehicle from a lane based on the traveling trajectory stored in the traveling trajectory storage means and the current position of the vehicle detected by the position detection means".

That is, in PTL 1, by determining deviation from a lane based on the past traveling position and the current position of a vehicle, it is possible to realize warning and return control at the time of lane deviation even in an environment where a lane dividing line is not present.

CITATION LIST

Patent Literature

PTL 1: JP 2015-162228 A

SUMMARY OF INVENTION

Technical Problem

However, in PTL 1, as described in the paragraph 0014 and the like, the past traveling position (traveling trajectory) stored in the traveling trajectory storage means of the car navigation is used. Thus, there is a problem that, in an environment where the position estimation accuracy of the car navigation is low, such as an environment where the accuracy of a global navigation satellite system (GNSS) is low, the quality of the past traveling position (traveling trajectory) as a reference is poor, and it is not possible to appropriately determine deviation from a lane. In addition, since the deviation is determined based on the average of a plurality of past traveling positions, an inappropriate reference traveling position at which the vehicle does not normally travel is calculated by average processing on a multilane road or at an intersection. Therefore, there is a disadvantage that it is not possible to appropriately determine the deviation even with reference to the inappropriate reference traveling position, and, for example, it is determined that the vehicle deviates while traveling on an appropriate route.

Therefore, an object of the present invention is to provide a driving assistance device capable of realizing lane deviation warning/control even at an intersection, on a multilane road and in an environment where no lane dividing lines are present and GNSS accuracy is low.

Solution to Problem

According to a representative example of the present invention, a driving assistance device includes a recording unit that records a plurality of past traveling positions of a vehicle and position estimation information relating to the past traveling positions, a relative position estimation unit that estimates a relative position of the vehicle from an output of a sensor that detects a surrounding of the vehicle, adds a history of the relative position to the past traveling position, and adds the output of the sensor, which is used to estimate the relative position, to the position estimation information, a position estimation unit that estimates a position of the vehicle with respect to the past traveling positions from the output of the sensor and the position estimation information of the recording unit, and adds a history of the estimated position to the past traveling position, a deviation determination unit that determines deviation from the plurality of past traveling positions by using a distribution of the plurality of past traveling positions, the position of the vehicle with respect to the plurality of past traveling positions, and a predetermined reference value, and a control unit that controls the vehicle to cancel a warning or deviation, when the deviation is determined.

Advantageous Effects of Invention

According to the present invention, it is possible to issue a warning for lane deviation or realize return control even at an intersection, on a multilane road and in an environment where no lane dividing lines are present and GNSS accuracy is low.

BRIEF DESCRIPTION OF DRAWINGS

FIG. 15 is a diagram illustrating a block configuration of a driving assistance device in Embodiment 3.

FIG. 16 is a diagram illustrating an example of a screen presented by a user input unit.

DESCRIPTION OF EMBODIMENTS

Hereinafter, a driving assistance device according to embodiments of the present invention will be described with reference to the drawings.

Embodiment 1

Hereinafter, a driving assistance device according to Embodiment 1 of the present invention will be described with reference to FIGS. 1 to 12.

(Block Configuration)

Figures 1, 2:
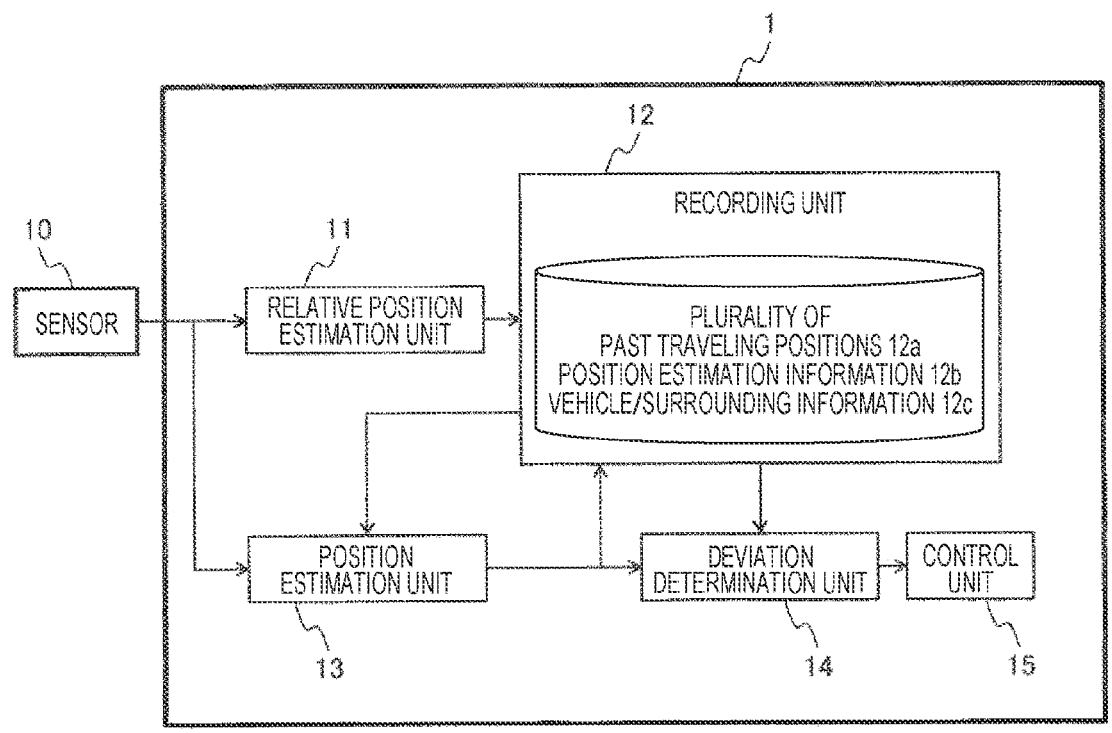
FIG. 1 is a functional block diagram of a driving assistance device according to Embodiment 1.
FIG. 2 is a diagram illustrating an example of position estimation information recorded in a recording unit.

FIG. 1 is a functional block diagram of a driving assistance device 1 according to the present embodiment. As illustrated in FIG. 1, the driving assistance device 1 includes a relative position estimation unit 11, a recording unit 12, a position estimation unit 13, a deviation determination unit 14, and a control unit 15. Measurement data of a sensor 10 is input to the relative position estimation unit 11 and the position estimation unit 13. Specifically, the driving assistance device 1 is a computer including hardware of an arithmetic operation device such as a CPU, a main storage device such as a ROM, an auxiliary storage device such as a RAM, a communication device, and the like. The functions described later are implemented in a manner that the arithmetic operation device executes a program loaded into the main storage device from the auxiliary storage device. Description will be made below while a well-known technique in such a computer field is appropriately omitted.

The sensor 10 is a sensor that is mounted on a vehicle and measures an environment around the vehicle, and is, for example, a monocular camera, a stereo camera, a LiDAR, a millimeter wave radar, a sonar, or the like. The sensor 10 measures a three-dimensional position of an object present around the vehicle. When a monocular camera is used, the acquired data is an image, and it is not possible to directly acquire the three-dimensional position. The three-dimensional position can be measured by using a plurality of images by a known motion stereo method or the like. In the present embodiment, a stereo camera is used as the sensor 10. In addition to the three-dimensional information, the stereo camera can detect information such as a lane and a stop line necessary for driving assistance, from an image. The sensor 10 is not limited to the stereo camera, and other sensors or a combination of a plurality of sensors, for example, a combination of a monocular camera and a LiDAR may be used. Furthermore, as the sensor 10, a sensor that measures the state of the vehicle may be used in addition to the sensor that measures the environment around the vehicle. For example, a GNSS, a compass, or a gyroscope that can measure the position and posture of the host vehicle may be used. In addition, a sensor that acquires information such as the position and posture of the host vehicle by communicating with a beacon or the like installed on a road may be used.

Next, each component of the driving assistance device 1 will be outlined, and then each component will be described in detail.

The relative position estimation unit 11 estimates the relative position of the vehicle in a lane on which the vehicle travels for the first time, based on the measurement data of the sensor 10. In addition, the relative position estimation unit 11 records, in the recording unit 12, the estimated relative position as a first past traveling position $12a_0$ in this lane and the measurement data of the sensor 10 used when the first past traveling position $12a_0$ is estimated, as first position estimation information $12b_0$. Here, the relative position of the vehicle refers to information indicating the relative position/posture based on the position/posture of the vehicle at a certain time point.

The recording unit 12 records a plurality of past traveling positions $12a$, position estimation information $12b$ relating to the past traveling positions $12a$, and vehicle/surrounding information $12c$. The plurality of past traveling positions $12a$ also include the first past traveling position $12a_0$, and the position estimation information $12b$ also includes the first position estimation information $12b_0$.

The position estimation unit 13 estimates a current position and posture (referred to as a "current position P" below) of the vehicle with respect to the past traveling position $12a$ based on the measurement data of the sensor 10 and the position estimation information $12b$ recorded in the recording unit 12. In addition, the position estimation unit 13 adds a history of the estimated current position P as the latest past traveling position to the past traveling position $12a$ of the recording unit 12, and outputs the result of the addition to the deviation determination unit 14. Thus, the position estimation unit 13 basically does not operate on a lane on which the vehicle travels for the first time, and operates only on a lane having a travel history.

The deviation determination unit 14 determines deviation from the plurality of past traveling positions $12a$ by using the plurality of past traveling positions $12a$ recorded in the recording unit 12, the current position P of the vehicle with respect to the plurality of past traveling positions $12a$, and a predetermined reference value Th.

When the deviation determination unit 14 determines deviation, the control unit 15 issues a warning to a driver or controls a steering system or an acceleration/deceleration system of the vehicle so as to cancel the deviation.

(Operation of Relative Position Estimation Unit 11)

Next, estimation processing of the relative position of the vehicle by the relative position estimation unit 11 will be described in detail. As described above, the relative position estimation unit 11 estimates the relative position of the vehicle in a lane on which the vehicle travels for the first time, based on the measurement data of the sensor 10. In addition, the relative position estimation unit 11 records, in the recording unit 12, the estimated relative position as the first past traveling position $12a_0$ and the measurement data of the sensor 10 used in this estimation, as the first position estimation information $12b_0$.

As described above, the relative position estimation unit 11 operates when the past traveling position 12a corresponding to the current environment is not included in the recording unit 12, that is, when the vehicle travels in the current environment for the first time. Thus, the relative position/posture estimated by the relative position estimation unit 11 functions as the first past traveling position $12a_0$ with respect to the environment (lane).

For example, when a monocular camera or a stereo camera is used as the sensor 10, the relative position estimation unit 11 can use a structure from motion (SfM) method or a visual simultaneous localization and mapping (VSLAM) method, which is a method of estimating the relative position/posture of the camera or the three-dimensional position of a feature point, by extracting the feature point and an image feature amount of the feature point from an image and associating feature points between the plurality of images by using the image feature amounts.

FIG. 2 is a diagram illustrating an example of the position estimation information 12b recorded in the recording unit 12 when the sensor 10 is a camera. As illustrated in FIG. 2, the position estimation information 12b is information defined by a combination of the "three-dimensional position" and the "image feature amount" of the feature point estimated by the SfM method or the VSLAM method. The three-dimensional position of the feature point has the same coordinate system as that of the past traveling position estimated by the SfM method or the VSLAM method.

On the other hand, when the sensor 10 is a stereo camera or a LiDAR, an iterative closest point-simultaneous localization and mapping (ICP-SLAM) method of estimating the position/posture of the sensor by associating the three-dimensional position output from the sensor 10 between a plurality of time points can be used. In this case, since the "image feature amount" illustrated in FIG. 2 is not essential, the position estimation information 12b may be defined only by the "three-dimensional position".

(Operation of Position Estimation Unit 13)

Next, details of estimation processing of a vehicle position by the position estimation unit 13 will be described. As described above, the position estimation unit 13 estimates the current position P of the vehicle with respect to the past traveling position 12a based on the measurement data of the sensor 10 and the position estimation information 12b recorded in the recording unit 12. In addition, the position estimation unit 13 adds the history of the current position P as the latest past traveling position to the past traveling position 12a of the recording unit 12, and outputs the result of the addition to the deviation determination unit 14.

For example, when a monocular camera or a stereo camera is used as the sensor 10, the position estimation unit 13 can estimate the position and posture from the correspondence between the two-dimensional and three-dimensional positions of the feature points. In this case, first, the position estimation unit 13 extracts the feature point and the image feature amount of the feature point from the image currently captured by the camera and associates the extracted data with the image feature amount included in the position estimation information 12b. In this manner, the position estimation unit 13 obtains a plurality of correspondences between the two-dimensional position of the feature point in the current image and the three-dimensional position included in the position estimation information 12b. Then, the position estimation unit 13 estimates the three-dimensional position/posture of the camera by using a solution of a known perspective n point (PnP) problem for estimating the position and posture of the camera from the correspondence between the two-dimensional and three-dimensional positions.

On the other hand, when the sensor 10 is a stereo camera or a LiDAR, an iterative closest point (ICP) method of estimating the position and posture between three-dimensional point groups by associating the three-dimensional point groups with each other can be used.

Here, the three-dimensional position included in the position estimation information 12b has the same coordinate system as that of the past traveling position 12a. Thus, the estimated three-dimensional position/posture of the camera has the same coordinate system as that of the past traveling position 12a, and the current position P with respect to the past traveling position 12a can be obtained.

(Operation of Recording Unit 12)

Next, details of recording processing by the recording unit 12 will be described. As described above, the plurality of past traveling positions 12a, the position estimation information 12b, and the vehicle/surrounding information 12c are recorded in the recording unit 12.

Figures 3, 4:
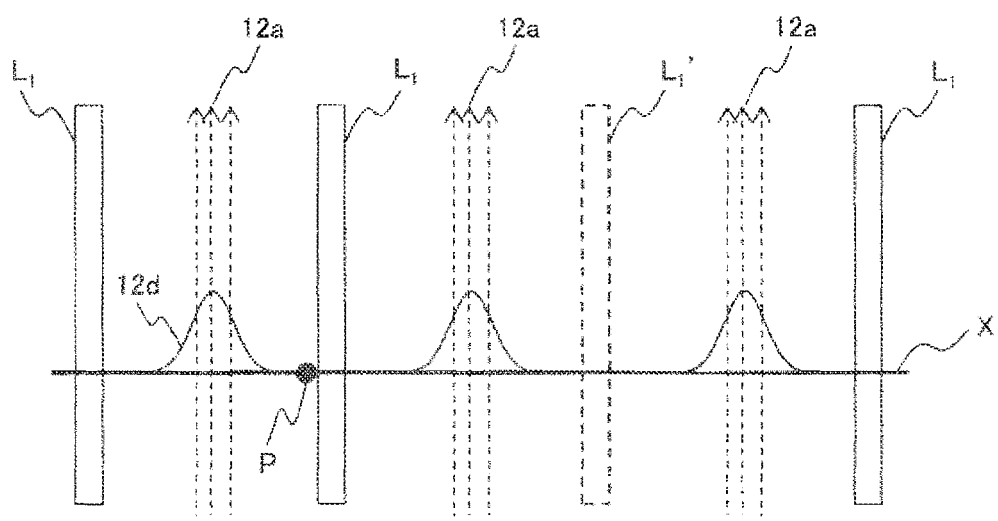
FIG. 3 is a diagram illustrating an example of vehicle/surrounding information recorded in the recording unit.
FIG. 4 is a diagram illustrating an example of deviation determination on a three-lane road.

The vehicle/surrounding information 12c is information obtained by grouping the past traveling positions estimated by the relative position estimation unit 11 and the position estimation unit 13 in accordance with a combination of the vehicle status and the surrounding status during traveling. FIG. 3 is an example of the vehicle/surrounding information 12c. In this example, it is illustrated that the past traveling positions 12a having traveling position IDs of 1, 5, and the like are classified into a group defined by the vehicle status and the surrounding status in the first row, and the past traveling positions 12a having traveling position IDs of 2, 3, and the like are classified into a group defined by the vehicle status and the surrounding status in the second row. The vehicle status refers to, for example, a driver or a type of a tire, and the number of passengers, and is estimated from the input from a user, the output of a sensor provided in a suspension, a seat, a seat belt, or the like, or the like. The surrounding status refers to, for example, the presence or absence of a preceding vehicle, the status of a signal, and the weather, and is estimated from the output of the sensor 10 or the like.

The vehicle status such as a vehicle speed and the turn-on status of a direction indicator at each position of the past traveling position 12a may be recorded together in the recording unit 12. Such a vehicle status can be acquired from a controller area network (CAN).

(Operation of Deviation Determination Unit 14)

Next, details of deviation determination processing executed in real time by the deviation determination unit 14 will be described with reference to FIGS. 4 to 11. The deviation determination unit 14 determines deviation from the plurality of past traveling positions, in real time, by using the plurality of past traveling positions 12a recorded in the recording unit 12, the current position P of the vehicle estimated by the position estimation unit 13, and the predetermined reference value Th.

First, the deviation determination unit 14 checks the traveling position ID belonging to the same group as the current vehicle status and surrounding status, with reference to the vehicle/surrounding information 12c recorded in the recording unit 12. Then, the deviation determination unit 14 determines deviation from a plurality of selected past traveling positions 12a by using a plurality of past traveling positions 12a corresponding to the traveling position ID, the current position P of the vehicle estimated by the position estimation unit 13, and the predetermined reference value Th. Processing contents of deviation determination by the deviation determination unit 14 for each specific road environment will be described below.

Figure 5:
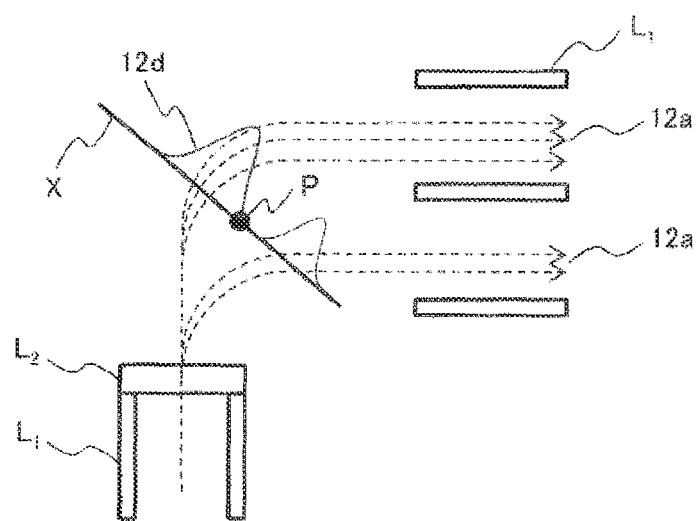
FIG. 5 is a diagram illustrating an example of deviation determination at an intersection.

FIG. 4 is a diagram illustrating an example of deviation determination on a three-lane road divided by lane dividing lines. Here, a lane dividing line $L_1$ detectable by the sensor 10 is indicated by a solid line, and a lane dividing line $L_1'$ that cannot be detected by the sensor 10 due to the influence of blur or the like is indicated by a broken line. FIG. 5 is a diagram illustrating an example of deviation determination at an intersection where a temporary stop line $L_2$ is present in addition to the lane dividing line $L_1$.

The deviation determination unit 14 determines deviation from the past traveling position 12a belonging to the same group as the current vehicle status and the surrounding status, and the current position P estimated by the position estimation unit 13.

First, the deviation determination unit 14 sets a straight line X in a direction perpendicular to a vehicle traveling direction by using the current position P as a reference.

Then, the deviation determination unit 14 applies a distribution to the coordinates of a point where the straight line X and each past traveling position 12a intersect with each other. In the examples of FIGS. 4 and 5, the past traveling position 12a is concentrated in the vicinity of any of ideal traveling positions. For such past traveling positions 12a, for example, by using a mixed normal distribution as the distribution, a multimodal distribution 12d in which three peaks are present can be obtained in the example of FIG. 4, and a multimodal distribution 12d in which two peaks are present can be obtained in the example of FIG. 5. Here, the value of the distribution 12d at each point on the straight line represents the presence probability of the vehicle at that point. The distribution 12d is not limited to the mixed normal distribution, and other probability distribution models may be used.

Finally, the deviation determination unit 14 compares the presence probability of the vehicle at the current position P, which is obtained from the distribution 12d, to the predetermined reference value Th. When the presence probability at the current position P is lower than the reference value Th, the deviation determination unit 14 determines that the vehicle deviates. When the direction indicator or a hazard lamp is turned on even when the presence probability at the current position P is lower than the reference value Th, the deviation determination unit 14 determines that the driver has intentionally performed a deviation operation and does not determine that the driver has deviated.

By repeating such processing during traveling, the deviation determination unit 14 can always monitor deviation from the lane.

Figure 6:
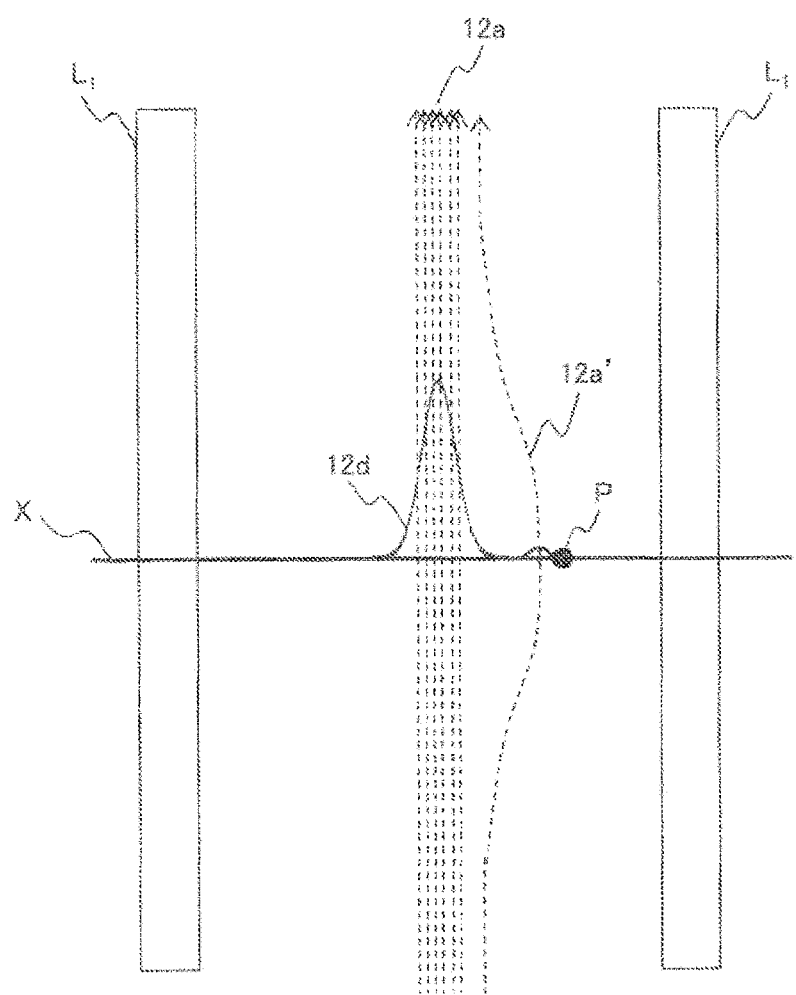
FIG. 6 is a diagram illustrating an example of deviation determination when an exceptional past traveling position is included.

FIG. 6 is a diagram illustrating an example of deviation determination when an exceptional past traveling position 12a' at the time of avoiding the parked vehicle is included in the past traveling position 12a belonging to the same group as the current vehicle status and the surrounding status. The number of the exceptional past traveling positions 12a' is much smaller than the number of other normal past traveling positions 12a. Thus, in the distribution 12d obtained by the deviation determination unit 14, an extremely small peak is formed at a position corresponding to the past traveling position 12a', but the probability thereof is small. Therefore, in the deviation determination based on the distribution 12d, the deviation determination unit 14 can correctly determine the deviation from the lane based on the majority of the normal past traveling positions 12a without being affected by the exceptional past traveling positions 12a'. In FIG. 6, the distribution 12d is obtained in consideration of the exceptional past traveling position 12a', but the distribution 12d may be obtained in a manner that an exceptional past traveling position where the probability at the point where the straight line X and each past traveling position intersect with each other is less than a predefined value may be deleted from the recording unit 12, and only the past traveling position 12a considered to be normal is used.

The deviation determination unit 14 may perform the deviation determination with respect to the vehicle status in addition to the deviation determination based on the current position P described above. The vehicle status that can be used in the deviation determination is, for example, the speed or the turn-on status of the direction indicator. Processing contents of deviation determination based on the vehicle information by the deviation determination unit 14 for each specific environment will be described below.

Figure 7:
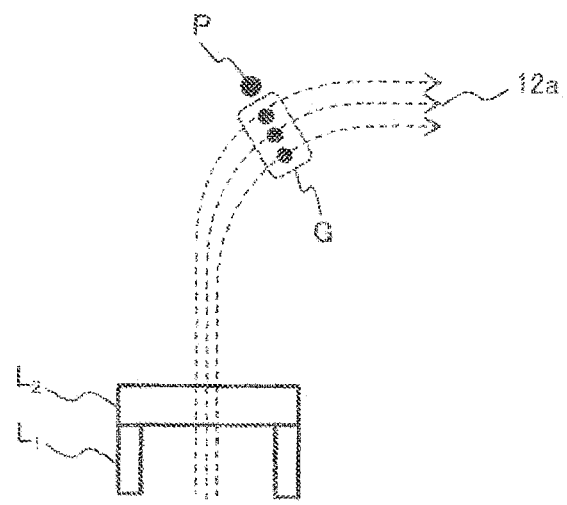
FIG. 7 is a diagram illustrating an example of deviation determination based on a speed at the intersection.
Figure 8:
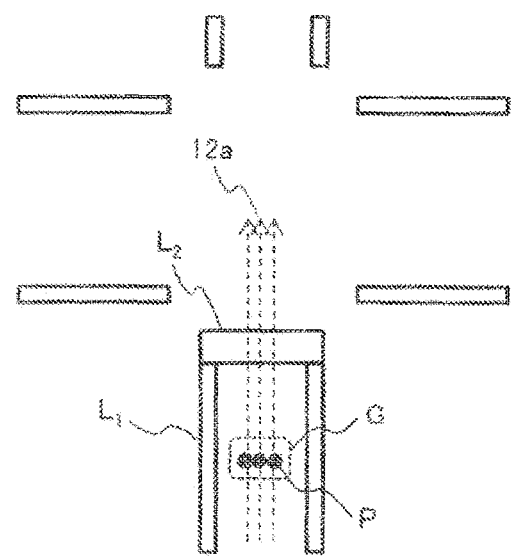
FIG. 8 is a diagram illustrating an example of deviation determination based on a speed before a temporary stop line.
Figure 9:
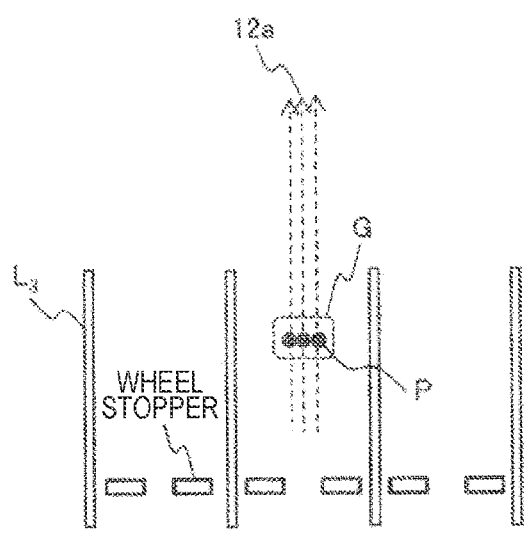
FIG. 9 is a diagram illustrating an example of deviation determination based on a speed in a parking lot.

FIG. 7 is a diagram illustrating an example of deviation determination based on the speed at an intersection. FIG. 8 is a diagram illustrating an example of deviation determination based on the speed before the temporary stop line $L_2$. FIG. 9 is a diagram illustrating an example of deviation determination based on the speed in a parking lot.

Figure 10:
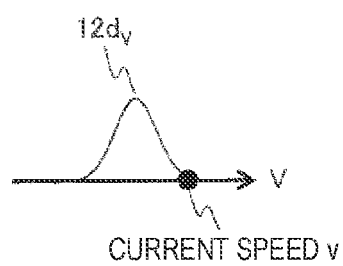
FIG. 10 is a diagram illustrating an example of a speed distribution.

In the deviation determination based on the speed, which has been illustrated in FIGS. 7 to 9, the deviation determination unit 14 first selects a set G of points on the past traveling positions 12a close to the current position P. Then, the deviation determination unit 14 acquires the speed V recorded in association with each point included in the set G, applies the mixed normal distribution, and obtains a speed distribution $12d_v$. FIG. 10 is a diagram illustrating an example of the speed distribution $12d_v$. The deviation determination unit 14 compares the presence probability of a current speed v, which is obtained from the speed distribution $12d_v$, to the predetermined reference value Th. When the presence probability of the current speed v is lower than the reference value Th, for example, when the speed is extremely higher than the standard speed, the deviation determination unit 14 determines that the vehicle deviates from the normal speed.

Figures 11, 12:
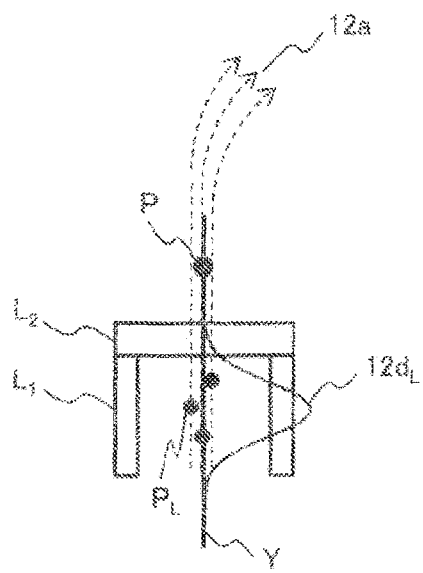
FIG. 11 is a diagram illustrating an example of deviation determination based on a turn-on status of a direction indicator.
FIG. 12 is a diagram illustrating an example of a distribution by a grid map.

FIG. 11 is a diagram illustrating an example of deviation determination based on the turn-on status of the direction indicator at an intersection. In the deviation determination based on the turn-on status of the direction indicator, the deviation determination unit 14 selects a position $P_L$ when the direction indicator turns on or off among the past traveling positions 12a. Here, the deviation determination unit 14 selects a turn-off position as the position $P_L$ when the current direction indicator is in a turn-on state, and selects a turn-on position as the position $P_L$ when the current direction indicator is in a turn-off state. Then, the deviation determination unit 14 sets a straight line Y in a traveling direction from the current position P. The deviation determination unit 14 projects a plurality of positions $P_L$ in a direction perpendicular to the straight line Y, applies the mixed normal distribution to the positions on the straight line Y, and obtains a distribution $12d_L$ regarding the turn-on position or the turn-off position of the direction indicator. The deviation determination unit 14 compares the presence probability of the current position P, which is obtained from the distribution $12d_L$ for the direction indicator, to the predetermined reference value Th. When the presence probability of the current position P is lower than the reference value Th, the deviation determination unit 14 determines that the current position P deviates from the normal turn-on position or turn-off position.

(Operation of Control Unit 15)

Next, the contents of vehicle control processing by the control unit 15 will be described. When the deviation determination unit 14 determines deviation in a position, a speed, turning on or turning off of the direction indicator, and the like, the control unit 15 issues a warning to the driver or controls the vehicle to cancel the deviation.

When issuing a warning to the driver, the control unit 15 notifies the driver of the deviation by sound, a screen of a navigation system, vibration of a steering, vibration of a seat, or other methods. When controlling the vehicle, the control unit 15 controls a steering, a brake, an accelerator, the direction indicator, and the like to cancel the deviation. The control for canceling the deviation will be specifically described.

For example, in FIGS. 4 and 5, it is determined that the position has deviated, by deviation determination. In this case, the control unit 15 first obtains, on the straight line X, a position that is closest to the current position P and at which the presence probability exceeds the predetermined reference value Th. Alternatively, the control unit 15 obtains a position that is closest to the current position P and at which the presence probability has the maximum value. Then, the control unit 15 controls the steering, the brake, and the accelerator so that the vehicle moves from the current position P to the obtained position exceeding the predetermined reference value Th or the obtained direction of the maximum value.

For example, in FIG. 10, it is determined that the speed has deviated, by the deviation determination. In this case, the control unit 15 first obtains a speed that is closest to the current speed v and at which the presence probability exceeds the predetermined reference value Th. Alternatively, the control unit 15 obtains a speed that is closest to the current speed v and at which the presence probability has the maximum value. Then, the control unit 15 controls the brake and the accelerator so that the vehicle accelerates or decelerates from the current speed v to the obtained speed exceeding the reference value Th or the obtained speed of the maximum value.

Further, for example, in FIG. 11, it is determined as deviation of the turn-on status of the direction indicator, by deviation determination. In this case, the control unit 15 controls the direction indicator to have the same turn-on status as the turn-on status of the direction indicator at the selected turn-on or turn-off position $P_L$ of the direction indicator.

(Effects)

According to Embodiment 1 described above, the following effects can be obtained.

(1) By using the position estimation information recorded in the recording unit, even in an environment where the accuracy of the GNSS is low, the position estimation unit can estimate the current position with respect to the past traveling position with high accuracy, and the deviation determination unit can determine deviation from the past traveling and perform warning/control.

(2) Even when the past traveling position includes a traveling position different from a normal traveling position such as avoidance of a parked vehicle, it is possible to determine deviation while suppressing the influence of the traveling position different from the normal traveling position.

(3) It is possible to correctly determine deviation even in an environment where a plurality of lanes are present.

(4) It is possible to perform warning and control when the vehicle status is different from the vehicle status in the past traveling.

(5) It is possible to perform warning and control for overspeed at an intersection (FIG. 7), non-stop on a temporary stop line (FIG. 8), sudden acceleration due to an accelerator/brake mistake in a parking lot (FIG. 9), and the like.

(6) It is possible to perform warning and control for forgetting to turn on or off the direction indicator at an intersection or the like.

(7) A change in the traveling position due to a change in the vehicle status or the surrounding status is not determined as deviation.

(8) The control unit can effectively cancel the deviation in accordance with the detected deviation mode.

(Modification Example of Embodiment 1)

The deviation determination unit 14 described above determines deviation based on the distribution $12d$ and the like calculated in real time with reference to the current position P. However, the method of calculating the distribution is not limited thereto. For example, a distribution calculated in advance may be recorded in the recording unit 12, and deviation determination may be performed by using this distribution. Specifically, the distribution may be obtained by dividing a space corresponding to a road environment into a grid map of a lattice shape and holding a value corresponding to the presence probability in each grid.

FIG. 12 is a diagram illustrating an example of the distribution by a grid map 12e. In this example, a value is assigned to each grid in accordance with a distance from the past traveling position 12a. A distribution for a plurality of past traveling positions 12a is obtained by performing similar processing for each past traveling position 12a and adding the obtained plurality of grid maps 12e.

In this case, the deviation determination unit 14 determines the deviation when the value of the grid corresponding to the current position P is less than the predetermined reference value Th. The control unit 15 controls the steering, the brake, and the accelerator so that the vehicle moves to a position where the value of the grid increases, with reference to the current position P.

When the deviation is determined by using the speed, the speed distribution $12d_v$ is calculated in advance and held in each grid of the grid map 12e by processing similar to the deviation determination unit 14. Further, when the deviation is determined by using the turn-on status of the direction indicator, a value is set to each grid in accordance with the distance from the turn-on/turn-off position of the direction indicator.

According to the above-described modification example of Embodiment 1, the following effects can be obtained. That is, by calculating the distribution in advance, it is possible to reduce the calculation load of real-time processing during traveling of the vehicle and to execute the deviation determination processing at a higher speed.

Embodiment 2

Next, a driving assistance device according to Embodiment 2 of the present invention will be described with reference to FIGS. 13 and 14. In the following description, the same components as those of Embodiment 1 are denoted by the same reference signs, and differences will be mainly described. The points not specifically described are the same as those in Embodiment 1.

A driving assistance system 2 in the present embodiment includes, in addition to the driving assistance device 1 in Embodiment 1, a lane departure warning (LDW) device 22 that performs warning/control based on a lane dividing line, a road departure warning (RDW) device 23 that performs warning/control based on a road edge, and an operation determination unit 21 that determines which one of the LDW device and the RDW device is used.

(Block Configuration)

Figure 13:
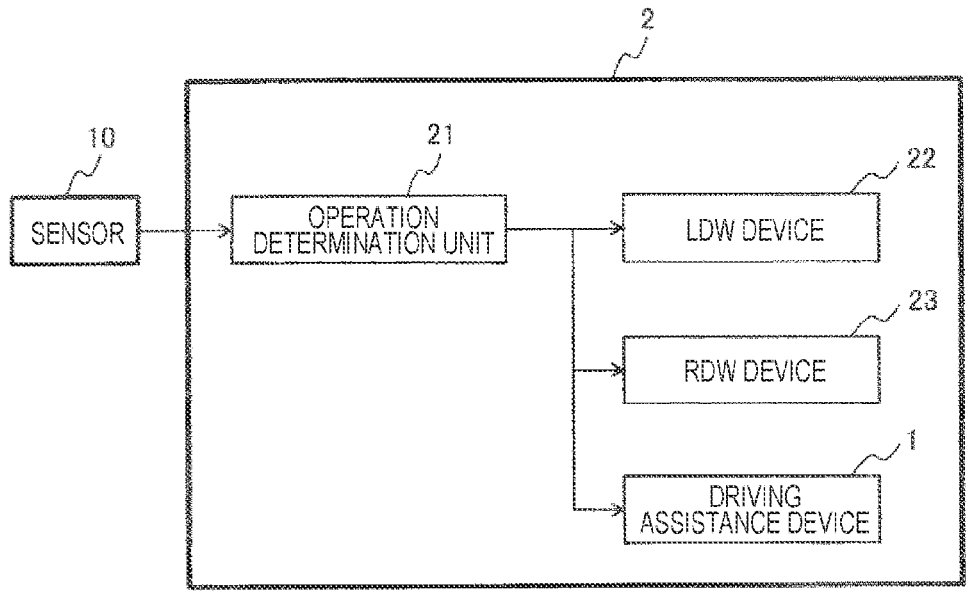
FIG. 13 is a diagram illustrating a block configuration of a driving assistance system in Embodiment 2.
Figure 14:
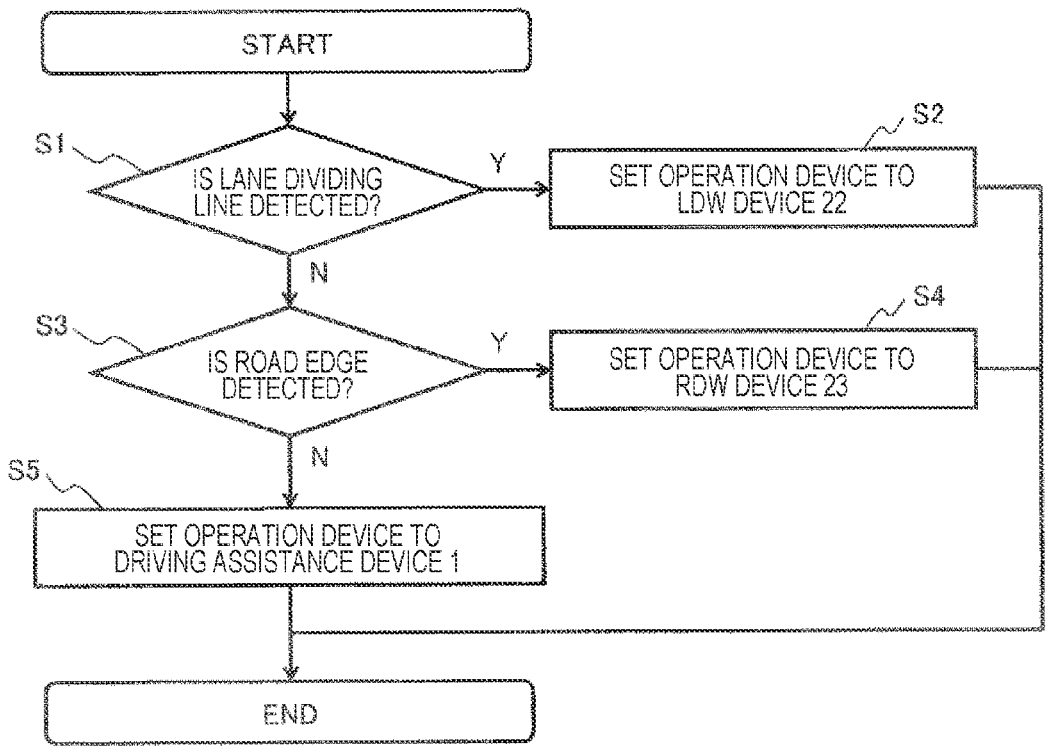
FIG. 14 is a diagram illustrating a processing flow of an operation determination unit.

FIG. 13 is a diagram illustrating a block configuration of the driving assistance system 2. As illustrated in FIG. 13, the driving assistance system 2 includes the operation determination unit 21, the LDW device 22, the RDW device 23, and the driving assistance device 1. The operation determination unit 21 determines which of the LDW device 22, the RDW device 23, and the driving assistance device 1 is to be operated, based on the output of the sensor 10. The LDW device 22 performs deviation determination and warning/control, based on the lane dividing line. The RDW device 23 performs deviation determination and warning/control, based on a road edge. A known method is used for the LDW device 22 and the RDW device 23.

(Operation of Operation Determination Unit)

Next, the contents of processing in the operation determination unit 21 will be described with reference to FIG. 14. The operation determination unit 21 determines which of the LDW device 22, the RDW device 23, and the driving assistance device 1 is to be operated, based on the output of the sensor 10.

First, in Step S1, the operation determination unit 21 determines whether a lane dividing line has been detected from the output of the sensor 10. When the lane dividing line is detected, the process proceeds to Step S2. When the lane dividing line is not detected, the process proceeds to Step S3.

In Step S2, the operation determination unit 21 sets the LDW device 22 as an operation device, and causes the LDW device 22 to perform warning/control based on the lane dividing line detected by the sensor 10.

In Step S3, the operation determination unit 21 determines whether a road edge is detected from the output of the sensor 10. When the road edge is detected, the process proceeds to Step S4. When the road edge is not detected, the process proceeds to Step S5.

In Step S4, the operation determination unit 21 sets the RDW device 23 as an operation device, and causes the RDW device 23 to perform warning/control based on the road edge detected by the sensor 10.

In Step S5, the operation determination unit 21 sets the driving assistance device 1 as the operation device, and causes the driving assistance device 1 to perform warning/control in a situation where neither the lane dividing line nor the road edge can be detected by the sensor 10.

(Effects)

According to Embodiment 2 described above, the following effects can be obtained.

(1) It is possible to appropriately perform deviation determination and warning/control in accordance with the environment.

(2) In an environment where the lane dividing line and the road edge are detected, the past traveling position 12a and the position estimation information 12b are not recorded in the recording unit 12. Thus, it is possible to reduce the usage amount of a storage area.

(Modification Example of Embodiment 2)

The operation determination unit 21 described above sets the operation device based on the detection results of the lane dividing line and the road edge from the output of the sensor 10. The method of setting the operation device is not limited thereto.

For example, a sensor such as a GNSS that estimates a map and the host vehicle position on the map may be additionally provided, and the operation determination unit 21 may set the operation device based on the position on the map. Specifically, the driving assistance device 1 that performs warning/control based on the past traveling position is set as the operation device in a place where it is known in advance that it is difficult to detect a lane dividing line and a road edge, such as an intersection, and a place where it is known in advance that it is difficult to perform warning/control based on a lane dividing line and a road edge, such as a road of alternating traffic without a lane dividing line. The LDW device 22 is set as the operation device in a place where there is a high probability of operating warning/control based on the lane dividing line, such as an expressway or a major national highway.

According to the above-described modification example of Embodiment 2, the following effects can be obtained. That is, it is possible to set an operation device suitable for each environment without being affected by the time required for detection processing of the lane dividing line and the road edge from the output of the sensor and an erroneous detection.

Embodiment 3

Next, a driving assistance device according to Embodiment 3 of the present invention will be described with reference to FIGS. 15 to 17. In the following description, the same components as those of Embodiment 1 are denoted by the same reference signs, and differences will be mainly described. The points not specifically described are the same as those in Embodiment 1.

A driving assistance device 3 in the present embodiment is obtained by adding a user input unit to the driving assistance device 1 in Embodiment 1. The user input unit receives valid/invalid information 12f for the deviation determination result, which is input from a user.

(Block Configuration)

FIG. 15 is a diagram illustrating a block configuration of the driving assistance device 3. As illustrated in FIG. 15, the driving assistance device 3 includes a relative position estimation unit 11, a recording unit 12, a position estimation unit 13, a deviation determination unit 14, a control unit 15, and a user input unit 31.

The user input unit 31 receives valid/invalid information 12f for the deviation determination result, which is input from the user. The recording unit 12 in the present embodiment records valid/invalid information 12f received by the user input unit 31, in addition to the information equivalent to that in Embodiment 1. The deviation determination unit 14 in the present embodiment determines deviation in consideration of the valid/invalid information 12f.

(Operation of User Input Unit)

Next, the contents of processing in the user input unit 31 will be described with reference to FIG. 16. The user input unit 31 receives valid/invalid information 12f for the deviation determination result from the input of the user.

FIG. 16 is a diagram illustrating an example of a screen 31a presented by the user input unit 31. The user input unit 31 presents the user with the date and time and the place determined as deviation by the deviation determination unit 14, by using a screen of a navigation system or the like. The place may be displayed by using a map of the navigation system. The user inputs being valid when the result determined as deviation is correctly determined, and inputs being invalid when the result is incorrectly determined. The input is performed by a touch or an operation such as a button on the screen. Thus, a place where the deviation determination unit 14 has performed erroneous deviation determination is specified.

(Operation of Deviation Determination Unit)

Next, the contents of deviation determination processing in the deviation determination unit 14 in the present embodiment will be described with reference to FIG. 17. The deviation determination unit 14 in the present embodiment determines whether or not to perform deviation determination based on the valid/invalid information 12f, prior to the deviation determination processing equivalent to that in Embodiment 1.

Figure 17:
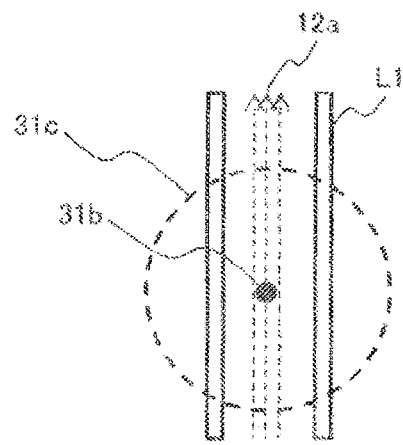
FIG. 17 is a diagram illustrating an example of deviation determination based on valid/invalid information.

FIG. 17 is a diagram illustrating an example of a status in which it is determined not to perform the deviation determination based on the valid/invalid information 12f. In this example, the deviation has been determined in the past at a position 31b, but the user inputs that the deviation determination has been invalid. Thus, when the current position P is included in a range 31c of a predetermined distance from the position 31b, the deviation determination unit does not perform the deviation determination. On the other hand, when the current position P is not included in the range 31c, the processing of the deviation determination unit 14 is performed.

(Effects)

According to Embodiment 3 described above, the following effects can be obtained. That is, since the deviation determination is not performed within a range of a predetermined distance from the invalidated past deviation position, the erroneous deviation determination is not repeated.

Embodiment 4

Next, a driving assistance device according to Embodiment 4 of the present invention will be described with reference to FIG. 18. The same components as those of Embodiment 1 are denoted by the same reference signs, and differences will be mainly described below. The points not specifically described are the same as those in Embodiment 1.

A driving assistance device 4 in the present embodiment is obtained by adding a data transmission and reception unit 4a that transmits and receives data, to the configuration corresponding to the driving assistance device 1 in Embodiment 1. By forming a system including a plurality of driving assistance devices 4 and a data sharing device 40, information acquired by the host vehicle can be expanded to another vehicle, or the host vehicle can perform deviation determination based on information acquired by another vehicle.

(Block Configuration)

Figure 18:
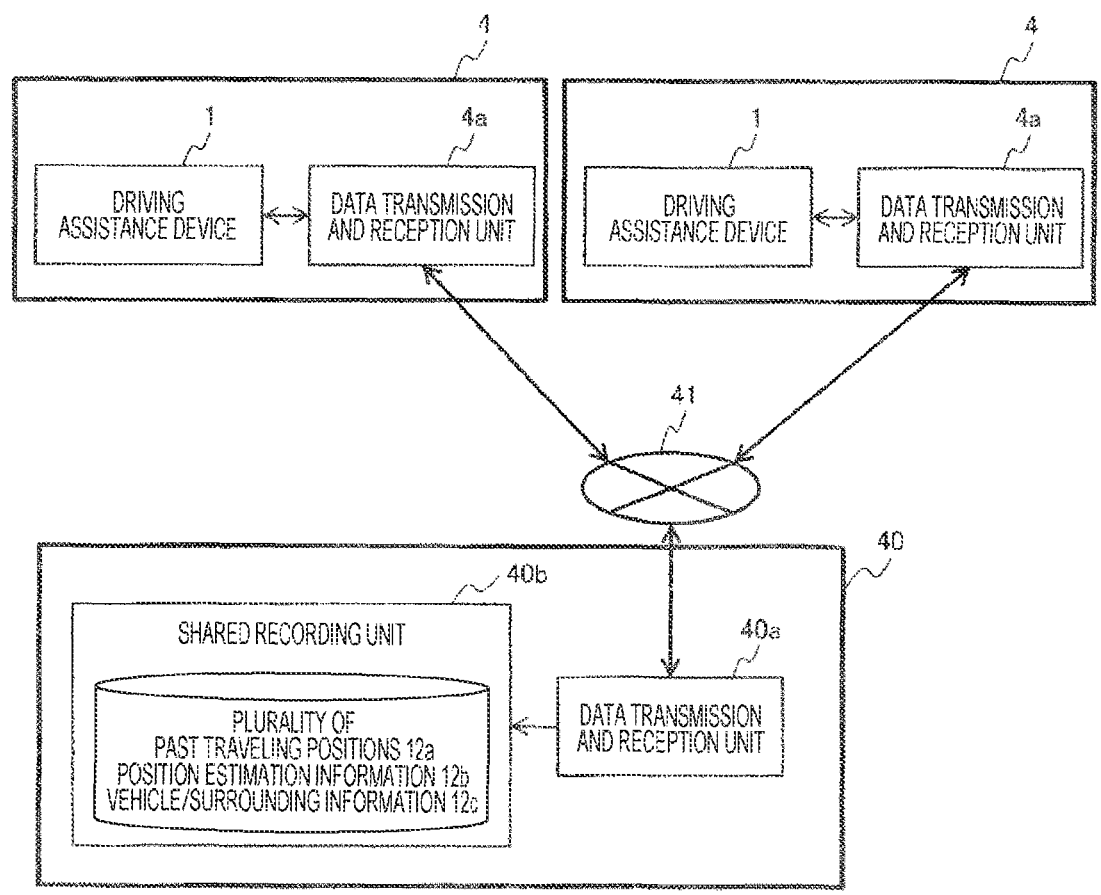
FIG. 18 is a diagram illustrating a system configuration of a driving assistance device in Embodiment 4 and a recorded data sharing device.

FIG. 18 is a diagram illustrating a block configuration of the driving assistance device 4 in the present embodiment and the data sharing device 40 that mediates each driving assistance device.

As illustrated in FIG. 18, the driving assistance device 4 includes the driving assistance device 1 in Embodiment 1 and the data transmission and reception unit 4a.

The data sharing device 40 includes a data transmission and reception unit 40a and a shared recording unit 40b. Two or more driving assistance devices 4 are connected to the data sharing device 40 via a network 41 such as a mobile phone network. The driving assistance devices 4 are mounted on different vehicles. The data sharing device 40 is installed in a server, for example.

The data transmission and reception unit 4a of the driving assistance device 4 transmits data recorded by the recording unit 12 of the driving assistance device 1 to the data sharing device 40 via the network 41. Data received from the data sharing device 40 is recorded as data of the recording unit 12 of the driving assistance device 1.

The data transmission and reception unit 40a of the data sharing device 40 outputs the data received from the driving assistance device 4 to the shared recording unit 40b. The data recorded by the shared recording unit 40b is transmitted to the driving assistance device 4.

(Operation of Shared Recording Unit)

Next, contents of processing in the shared recording unit 40b will be described. The shared recording unit 40b integrates and records the stored data received from a plurality of driving assistance devices 4.

First, similar to the recording unit 12, the shared recording unit 40b groups the past traveling positions based on the vehicle/surrounding information 12c. Here, in the shared recording unit 40b, a vehicle type may be used as the vehicle status in addition to the vehicle status used in the recording unit 12. Instead of individually identifying the driver, an attribute of the driver such as the age of the driver may be used. The subsequent process is performed on each group.

Then, the shared recording unit 40b unifies the coordinate systems of the stored data received from the plurality of driving assistance devices 4. Since the stored data of each driving assistance device 4 is recorded in a unique coordinate system, it is necessary to unify the coordinate systems in order to integrate the plurality of recorded data. In order to unify the coordinate systems, matching of three-dimensional positions included in the position estimation information 12b of each recorded data can be used. For example, an iterative closest point (ICP) method of estimating the position/posture between three-dimensional point groups by associating the three-dimensional point groups with each other can be used.

Then, the shared recording unit 40b selects a past traveling position to be transmitted to the driving assistance device 4 from a large number of past traveling positions having a unified coordinate system. For example, similarly to the processing of the deviation determination unit 14, the current position P is virtually set, and the distribution is applied to all the past traveling positions. When a predetermined number of past traveling positions are selected and the distribution is applied, the past traveling positions are selected such that the difference between the shape of the distribution and the distribution applied to all the past traveling positions is the smallest. Thus, it is possible to obtain a distribution similar to the case of using all the past traveling positions, by using a small number of past traveling positions.

(Effects)

According to Embodiment 4 described above, the following effects can be obtained.

(1) By using a large number of past traveling positions acquired from a large number of vehicles, it is possible to determine deviation with higher accuracy. In addition, even in a place where the host vehicle has not traveled in the past, it is possible to determine deviation and perform warning/control.

(2) By expressing a distribution similar to a distribution including a large number of data using a small number of past traveling positions, it is possible to reduce the data capacity communicated through the network and the storage capacity of the driving assistance device.

Embodiment 5

Next, a driving assistance device according to Embodiment 5 of the present invention will be described with reference to FIGS. 19 and 20. The same components as those of Embodiment 1 are denoted by the same reference signs, and differences will be mainly described below. The points not specifically described are the same as those in Embodiment 1.

A driving assistance device 5 in the present embodiment is obtained by adding a trajectory planning unit 51 that plans the trajectory of the vehicle from the output of the sensor 10, to the driving assistance device 1 in Embodiment 1.

(Block Configuration)

Figure 19:
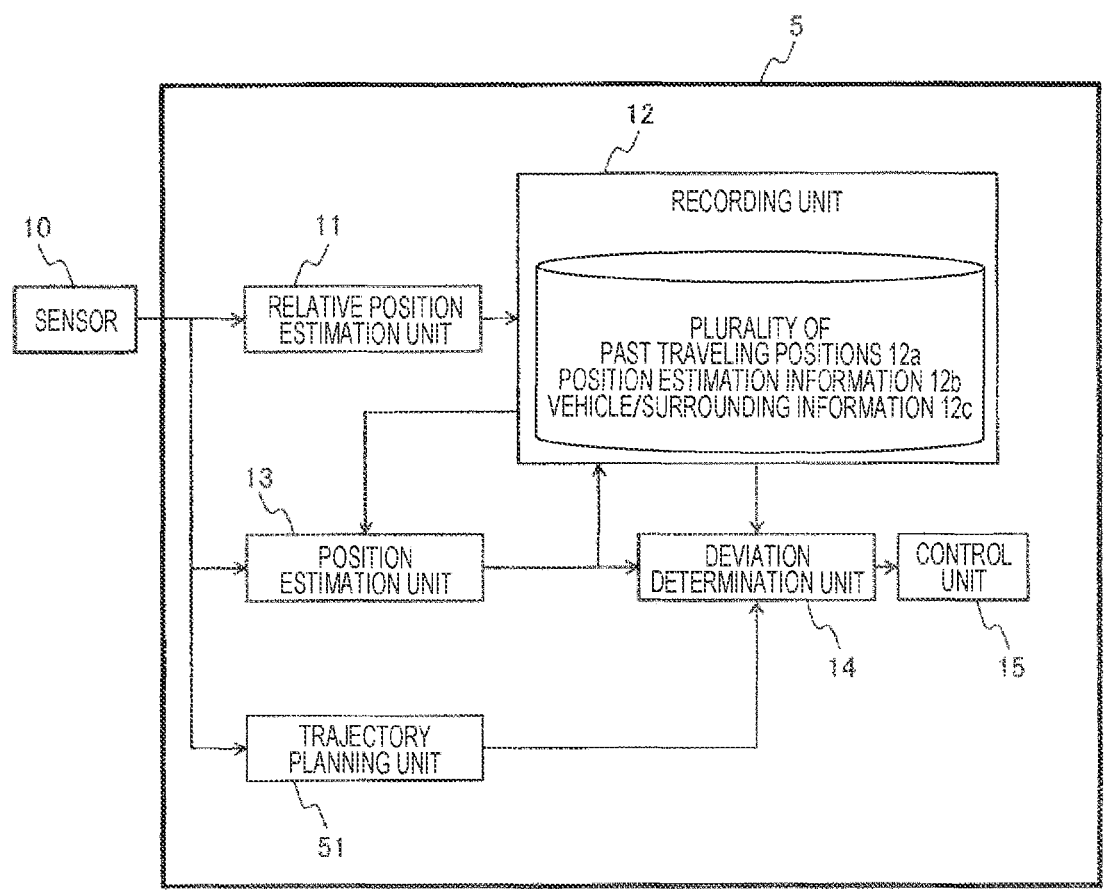
FIG. 19 is a diagram illustrating a block configuration of a driving assistance device in Embodiment 5.

FIG. 19 is a diagram illustrating a block configuration of the driving assistance device 5. As illustrated in FIG. 19, the driving assistance device 5 includes a relative position estimation unit 11, a recording unit 12, a position estimation unit 13, a deviation determination unit 14, a control unit 15, and the trajectory planning unit 51. The trajectory planning unit 51 plans the target trajectory on which the vehicle is to travel from the output of the sensor 10, but may plan the target trajectory by using a map, a destination input by the user, or the like in addition to the output of the sensor 10. The deviation determination unit 14 in the present embodiment determines deviation by using the trajectory planned by the trajectory planning unit 51, in addition to the determination method in Embodiment 1.

(Operation of Deviation Determination Unit)

Next, the contents of processing in the deviation determination unit 14 in the present embodiment will be described with reference to FIG. 20.

Figure 20:
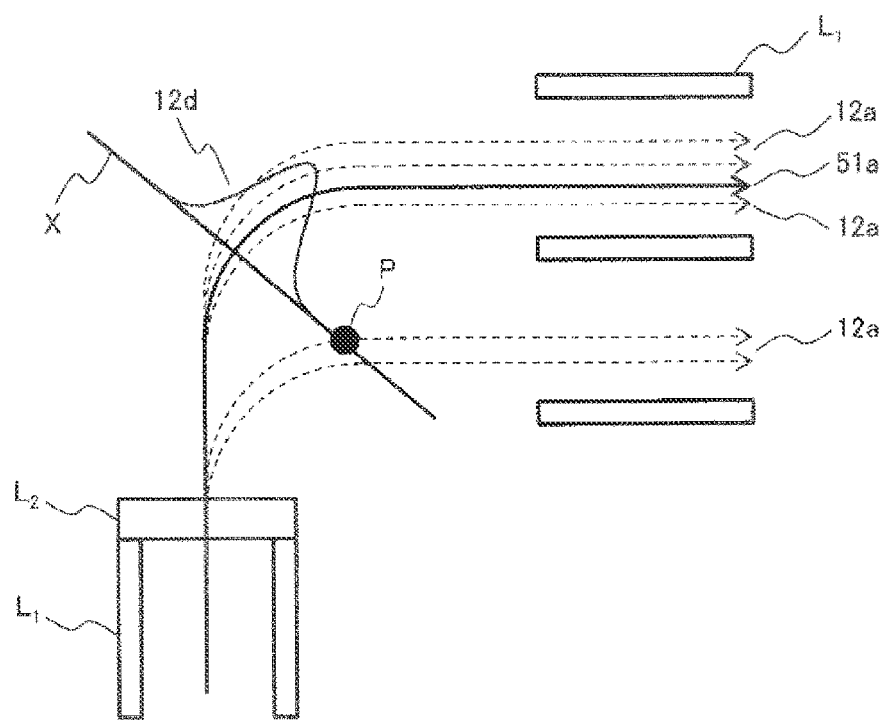
FIG. 20 is a diagram illustrating an example of deviation determination using a target trajectory.

FIG. 20 is a diagram illustrating an example of deviation determination using the target trajectory. In the present embodiment, a target trajectory 51a planned by the trajectory planning unit 51 is input to the deviation determination unit 14. Therefore, the deviation determination unit 14 considers the target trajectory 51a in creating the distribution 12d. Specifically, the deviation determination unit 14 first selects the past traveling position 12a within a predetermined range from the target trajectory 51a. Thus, in the example of FIG. 20, only the past traveling position 12a traveling in the lane on the upper side of FIG. 20 is selected, and the past traveling position 12a traveling in the lane on the lower side of FIG. 20 is excluded. Then, by using the selected past traveling position 12a and the selected target trajectory 51a, the distribution 12d is applied by processing similar to the deviation determination unit 14. Here, in the application of the distribution 12d, a weight may be added to the past traveling position 12a and the target trajectory 51a. For example, the influence of the target trajectory 51a on the distribution 12d may be further increased by increasing the weight for the target trajectory 51a.

Then, the deviation determination unit 14 determines deviation based on the fitted distribution 12d, by processing similar to that of Embodiment 1.

Similarly, the target trajectory 51a planned by the trajectory planning unit 51 may also be used in deviation determination based on the speed and the turn-on status of the direction indicator. Specifically, the trajectory planning unit 51 plans the target speed for the target trajectory 51a and the turn-on status of the target direction indicator, and the deviation determination unit 14 creates the distribution 12d by using the target speed and the turn-on status of the target direction indicator.

(Effects)

According to Embodiment 5 described above, the following effects can be obtained.

(1) The number of past traveling positions used for applying the distribution is reduced, and the deviation determination processing becomes fast. A movement different from the target trajectory can be determined as deviation. Further, when the past traveling position includes a traveling position different from a normal traveling position, such as a traveling position when the parked vehicle is avoided, deviation can be determined by excluding the traveling position different from the normal traveling position.

(2) By using the past traveling position in addition to the target trajectory, it is possible to determine deviation in consideration of shift within a normal range from the target trajectory in accordance with the position and vehicle/surrounding information.

Embodiment 6

Next, a driving assistance device according to Embodiment 6 of the present invention will be described with reference to FIGS. 21 and 22. The same components as those of Embodiment 1 are denoted by the same reference signs, and differences will be mainly described below. The points not specifically described are the same as those in Embodiment 1.

A driving assistance device 6 in the present embodiment includes a similar position estimation unit 61 that replaces the relative position in the environment where the vehicle has traveled for the first time, with a position with respect to the similar past traveling position 12a from the output of the sensor 10, the output of the relative position estimation unit 11, and the plurality of past traveling positions 12a and the position estimation information 12b recorded in the recording unit 12.

(Block Configuration)

Figure 21:
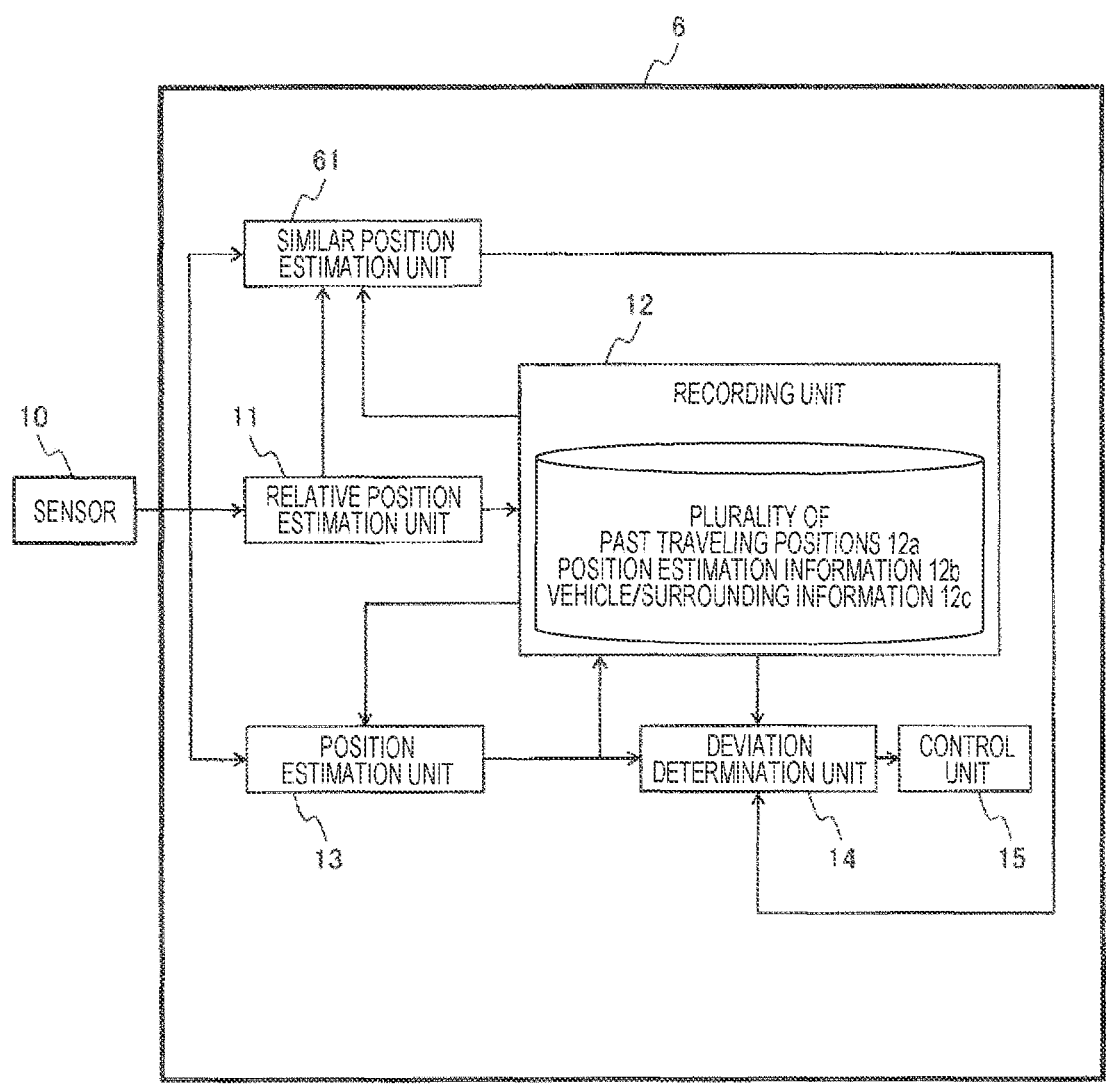
FIG. 21 is a diagram illustrating a block configuration of a driving assistance device in Embodiment 6.

FIG. 21 is a diagram illustrating a block configuration of the driving assistance device 6. As illustrated in FIG. 21, the driving assistance device 6 includes a relative position estimation unit 11, a recording unit 12, a position estimation unit 13, a deviation determination unit 14, a control unit 15, and the similar position estimation unit 61.

(Operation of Similar Position Estimation Unit 61)

Next, contents of processing by the similar position estimation unit 61 will be described. The similar position estimation unit 61 replaces the relative position in the environment where the vehicle has traveled for the first time, with a position with respect to the similar past traveling position 12a from the output of the sensor 10, the output of the relative position estimation unit 11, and the plurality of past traveling positions 12a and the position estimation information 12b recorded in the recording unit 12.

Figure 22:
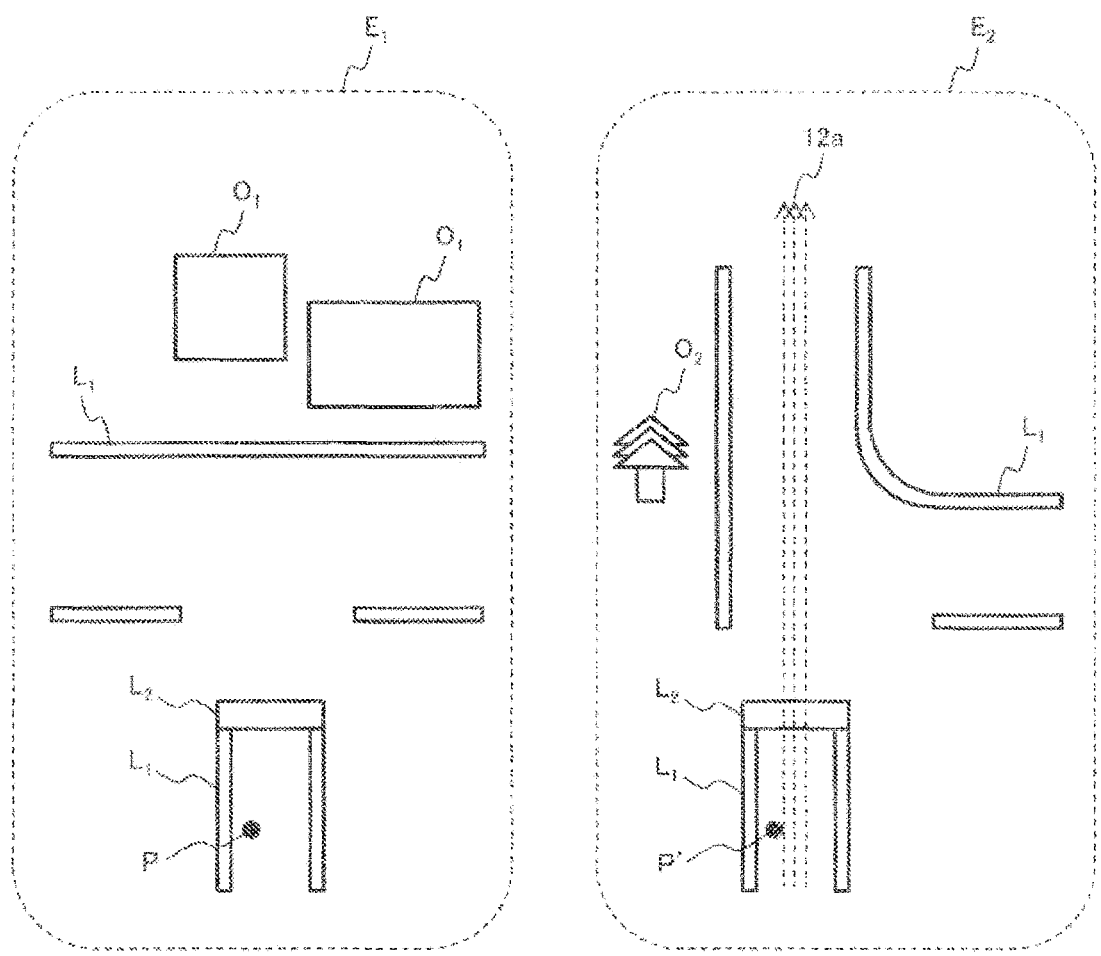
FIG. 22 is a diagram illustrating an example of processing in a similar position estimation unit.

FIG. 22 is a diagram illustrating an example of processing by the similar position estimation unit 61, and illustrates an environment $E_1$ (left diagram) around the current position P and an environment $E_2$ (right diagram) around the past traveling position 12a recorded in the recording unit 12. When the two environments are compared, there is a difference that the vehicle cannot travel straight from the current position in the environment $E_1$ and cannot turn left from the current position in the environment $E_2$, but both of the environments are similar in that the vehicle needs to stop temporarily at the temporary stop line $L_2$ before merging into the priority road from the current position.

As described above, when the past traveling position 12a at the time of traveling in the past environment $E_2$ similar to the current environment $E_1$ is recorded in the recording unit 12, the similar position estimation unit 61 replaces the current position P of the vehicle in the current environment $E_1$ with a position P' in the past environment $E_2$. Specifically, first, the similar position estimation unit 61 detects a similar object present in both the current environment $E_1$ and the past environment $E_2$. Examples of the similar object include road marks such as a lane dividing line $L_1$ and a temporary stop line $L_2$ detected from the output of the sensor 10, three-dimensional objects such as a building $O_1$ and a tree $O_2$, and position estimation information 12b obtained from the relative position estimation unit 11. In the example of FIG. 22, the temporary stop line $L_2$ is detected as the similar object. Then, the similar position estimation unit 61 calculates the position P' in the past environment $E_2$ by adding the current position P of the vehicle with respect to the similar object in the current environment $E_1$ to the position of the similar object in the past environment $E_2$. Finally, the similar position estimation unit 61 outputs the position P' with respect to the past traveling position to the deviation determination unit 14. Thus, the deviation determination unit 14 can perform the deviation determination on the assumption that the vehicle is traveling at the position P' in the past environment $E_2$.

(Effects)

According to Embodiment 6 described above, the following effects can be obtained. That is, even in a place where the host vehicle has not traveled in the past, it is possible to determine deviation by using the past traveling position in a similar environment and to perform warning/control.

Note that, the present invention is not limited to the above embodiments, and various modifications may be provided. For example, the above embodiments are described in detail in order to explain the present invention in an easy-to-understand manner, and the above embodiments are not necessarily limited to a case including all the described configurations. Other forms considered within the scope of the technical idea of the present invention are also included in the scope of the present invention. Further, some components in one embodiment can be replaced with the components in another embodiment, and the configuration of another embodiment can be added to the configuration of one embodiment. Regarding some components in the embodiments, other components can be added, deleted, and replaced. Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), or a recording medium such as an IC card, an SD card, and a DVD.

REFERENCE SIGNS LIST 1, 3 to 6 driving assistance device
2 driving assistance system
10 sensor
11 relative position estimation unit
12 recording unit
12a, 12a' past traveling position
12b position estimation information
12c vehicle/surrounding information
12d, $12d_v$, $12d_L$ distribution
12e grid map
12f valid/invalid information
13 position estimation unit
14 deviation determination unit
15 control unit
21 operation determination unit
22 LDW device
23 RDW device
31 user input unit
4a data transmission and reception unit
40 data sharing device
40a data transmission and reception unit
40b shared recording unit
51 trajectory planning unit
61 similar position estimation unit

The invention claimed is:

1. A driving assistance device comprising:
a recording unit that records a plurality of past traveling positions of a vehicle and position estimation information relating to the past traveling positions;
a relative position estimation unit that estimates a relative position of the vehicle from an output of a sensor that detects a surrounding of the vehicle, adds a history of the relative position to the past traveling position, and adds the output of the sensor, which is used to estimate the relative position, to the position estimation information;
a position estimation unit that estimates a position of the vehicle with respect to the past traveling positions from the output of the sensor and the position estimation information of the recording unit, and adds a history of the estimated position to the past traveling position;
a deviation determination unit that determines deviation from the plurality of past traveling positions by using a distribution of the plurality of past traveling positions, the position of the vehicle with respect to the plurality of past traveling positions, and a predetermined reference value; and
a control unit that controls the vehicle to cancel a warning or deviation, when the deviation is determined.

2. The driving assistance device according to claim 1, wherein
the deviation determination unit uses a multimodal distribution as the distribution.

3. The driving assistance device according to claim 1, wherein
the recording unit further records a vehicle status of the vehicle, and
the deviation determination unit determines the deviation by using the vehicle status recorded in the recording unit and a vehicle status obtained during actual traveling.

4. The driving assistance device according to claim 3, wherein
the deviation determination unit determines deviation of a speed of the vehicle by using the speed that is one type of the vehicle status and a speed obtained during the actual traveling.

5. The driving assistance device according to claim 3, wherein
the deviation determination unit determines deviation of a turn-on status of a direction indicator by using the turn-on status of the direction indicator that is one type of the vehicle status, and the turn-on status of the direction indicator obtained during the actual traveling.

6. The driving assistance device according to claim 1, wherein
the recording unit further records vehicle/surrounding information including at least one of a driver of the vehicle, a tire, a number of passengers, presence or absence of a preceding vehicle, a turn-on status of a traffic light, and weather, and
the deviation determination unit compares the vehicle/surrounding information in the recording unit with vehicle/surrounding information obtained during actual traveling, selects the plurality of past traveling positions under the same condition, and determines deviation based on the plurality of selected past traveling positions.

7. The driving assistance device according to claim 1, wherein
a distribution of the plurality of past traveling positions calculated in advance is recorded in the recording unit, and
the deviation determination unit determines the deviation from the plurality of past traveling positions by using the distribution of the recording unit, the position of the vehicle with respect to the plurality of past traveling positions, and the predetermined reference value.

8. A driving assistance system comprising:
the driving assistance device according to claim 1;
an Lane Departure Warning (LDW) device that determines deviation based on a lane dividing line and controls a warning or the vehicle;
an Road Departure Warning (RDW) device that determines deviation based on a road edge and controls a warning or the vehicle; and
an operation determination unit that determines which of the LDW device, the RDW device, and the driving assistance device is to be operated.

9. The driving assistance system according to claim 8, wherein
when a lane dividing line and a road edge are not detected from the output of the sensor, the operation determination unit operates the driving assistance device.

10. The driving assistance system according to claim 8, further comprising a sensor that estimates a position of the vehicle on a map,
wherein the operation determination unit operates the driving assistance device based on the position of the vehicle on the map.

11. The driving assistance device according to claim 1, further comprising a user input unit that receives, from a user, information indicating validity/invalidity of a position determined as the deviation,
wherein, when the position of the vehicle is included within a predetermined distance from the position determined as the invalidated deviation, the deviation determination unit does not perform deviation determination.

12. A driving assistance system in which the driving assistance device according to claim 1 and a data sharing device are connected to each other via a network, wherein
the data sharing device includes a shared recording unit that integrates data received from a plurality of the driving assistance devices, records the integrated data as shared record data, and provides the shared record data for each of the driving assistance devices.

13. The driving assistance system according to claim 12, wherein
the shared recording unit selects a past traveling position and provides the selected past traveling position for each of the driving assistance devices, such that a difference between a shape of a distribution applied to all the past traveling positions and a shape of a distribution applied to the selected past traveling position is minimized.

14. The driving assistance device according to claim 1, further comprising a trajectory planning unit that plans a target trajectory of the vehicle from the output of the sensor,
wherein the deviation determination unit determines the deviation by using a distribution of the past traveling positions within a predetermined range from the target trajectory.

15. The driving assistance device according to claim 14, wherein
the deviation determination unit applies the distribution to the past traveling position and the target trajectory with a weight.

16. The driving assistance device according to claim 1, further comprising a similar position estimation unit that replaces a relative position in a current environment with a similar position with respect to the past traveling position, from the output of the sensor, an output of the relative position estimation unit, and the plurality of past traveling positions and the position estimation information recorded in the recording unit.

* * * * *